United States Patent [19]
Dickensheet

[11] 4,123,853
[45] Nov. 7, 1978

[54] EDUCATIONAL DEVICE FOR DYSLEXIC CHILDREN

[76] Inventor: Janis A. Dickensheet, 3313 E. Seminole, Springfield, Mo. 65804

[21] Appl. No.: 791,357

[22] Filed: Apr. 27, 1977

[51] Int. Cl.² .............................................. G09B 1/20
[52] U.S. Cl. ..................................... 35/77; 35/35 G; 35/58
[58] Field of Search ............. 35/9 H, 27, 35 R, 35 G, 35/35 H, 58, 77, 69, 71; 273/143 R

[56] References Cited

U.S. PATENT DOCUMENTS

| | | | |
|---|---|---|---|
| 853,756 | 5/1907 | Betis | 35/77 X |
| 1,856,650 | 5/1932 | McLintock | 35/27 |
| 2,535,474 | 12/1950 | Zerpa | 273/143 R |
| 3,562,923 | 2/1971 | Chuy | 35/9 H |
| 3,726,027 | 4/1973 | Cohen | 46/24 X |
| 3,742,616 | 7/1973 | Heller | 35/58 X |
| 4,045,884 | 9/1977 | Zand | 35/35 R |

FOREIGN PATENT DOCUMENTS

| | | | |
|---|---|---|---|
| 523,737 | 11/1953 | Belgium | 35/69 |
| 911,122 | 2/1946 | France | 35/27 |
| 193,470 | 2/1923 | United Kingdom | 35/71 |
| 767,299 | 1/1957 | United Kingdom | 35/71 |

OTHER PUBLICATIONS

Definition and Picture of "Cotter" Websters Seventh New Collegiate Dictionary.

*Primary Examiner*—Harland S. Skogquist
*Attorney, Agent, or Firm*—John J. Byrne

[57] ABSTRACT

Disclosed is an educational device for dyslexic children which comprises a base, a shaft mounted on the base, a plurality of blocks mounted on the shaft for rotation relative to the base, and a mirror mounted on the base facing the shaft. Mirror-image and/or totally backwards indicia are carried by the blocks on at least one face of each of the blocks, whereby the blocks can be rotated to positions in which the indicia are reflected by the mirror.

7 Claims, 4 Drawing Figures

EDUCATIONAL DEVICE FOR DYSLEXIC CHILDREN

BACKGROUND OF THE INVENTION

This invention relates to educational devices for dyslexic children.

Dyslexia may be broadly defined as the loss of power to grasp the meaning of that which is read, Webster's New Twentieth Century Dictionary of the English Language (2d. ed. 1965), or as an inability to read understandably due to a central lesion. Dorland's Illustrated Medical Dictionary (1965). In particular, dyslexia is often characterized by perception of objects, including letters, either in mirror-image form or in what might be called totally backwards form — that is, rotated about two separate orthogonal axes. The first of these conditions is referred to herein as partial dyslexia, and the second as total dyslexia.

Various methods for treating dyslexia are known, and most of these methods employ various kinds of educational devices. Typically such devices employ one or more mirrors to rotate the image of objects, including letters, in a fashion contrary to the incorrect rotation perceived by the individual being treated. A need has remained, however, for such a device which is simple and sturdy, which can be used with very young children (or with children or adults who are retarded as well as dyslexic), and which can be used to teach basic manipulative skills as well as to treat dyslexia.

OBJECTS OF THE INVENTION

It is, therefore, a general object of the invention to provide an educational device for dyslexic children.

It is a particular object of the invention to provide such a device which is simple and sturdy, which can be used with very young children (or with children or adults who are retarded as well as dyslexic), and which can be used to teach basic manipulative skills as well as to treat dyslexia.

Other objects and advantages of the present invention will become apparent from the following detailed description of a preferred embodiment thereof taken in conjunction with the accompanying drawings.

THE DRAWINGS

DETAILED DESCRIPTION OF THE PRESENTLY PREFERRED EMBODIMENT

Figure 1:
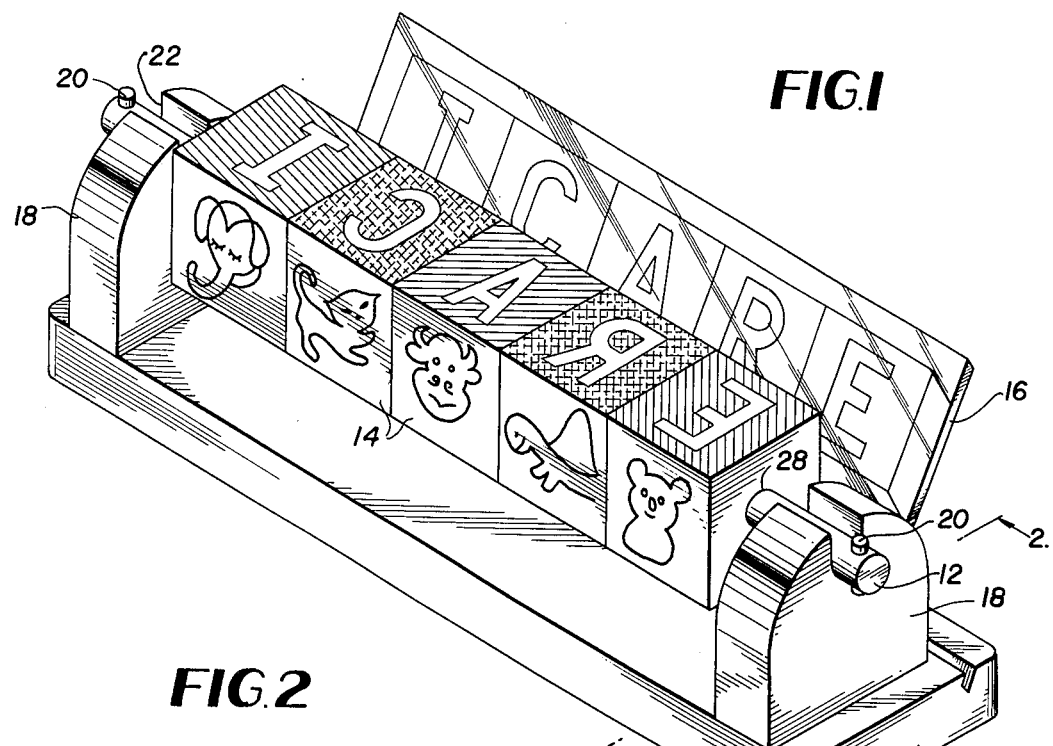
FIG. 1 is a perspective view of the presently preferred embodiment of the subject invention.
Figure 2:
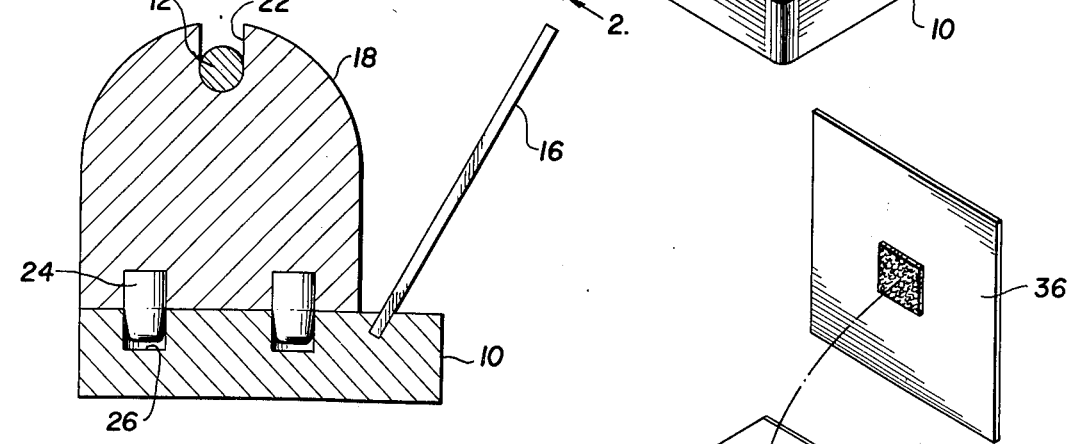
FIG. 2 is a sectional view taken along the line 2—2 in FIG. 1.

Preferring now particularly to FIGS. 1 and 2, there will be seen an educational device for dyslexic children comprising a base 10, a shaft 12 mounted on the base 10, a plurality of blocks 14 mounted on the shaft 12 for rotation relative to the base 10, and a mirror 16 mounted on the base 10 facing the shaft 12. Although not directly visible in FIG. 1, mirror-image indicia (specifically, letters) are carried by the blocks 14 on their faces adjacent to the mirror 16, and those indicia are visible in normal orientation in the mirror 16. Additional indicia which are totally backwards (that is, rotated about two separate orthogonal axes) are also carried by each of the blocks 14 on their uppermost faces in FIG. 1, and the other two working faces can carry pictures of animals, flowers, numbers, arithmetic symbols, etc., or they can carry means, such as those shown in FIGS. 3 and 4 and described hereinafter, for releasably mounting additional indicia. It should be particularly noted that the mirror-image indicium and the totally backwards indicium on each block are of the same thing (e.g. of the same letter), and the totally backwards indicium and the mirror-image indicium are related so that, when the totally backwards indicium is directly visible, the mirror-image indicium is reflected in the mirror 16 in its normal orientation.

Preferably, the educational device additionally comprises two bearing blocks 18, one mounted at each end of the base 10, and two pegs 20 mounted in and projecting from each end of the shaft 12 outside the bearing blocks 18, thereby limiting the axial movement of the shaft 12. The bearing blocks 18 have open-topped slots 22 at their tops sized to journal the shaft 12 and tapered dowels 24 at their bottoms sized to fit into corresponding holes 26 in the base 10. Preferably the bearing blocks 18 are releasably mounted on the base 10, the pegs 20 are releasably mounted in the shaft 12, and the blocks 14 are releasably mounted on the shaft 12. This feature permits the child to take the device apart and re-assemble it, thereby developing his manipulative skills as well as helping in the treatment of dyslexia. Of course, providing that at least one of the pegs 20 is releasably mounted on the shaft 12 also permits the child to rearrange the order of the blocks or to substitute other blocks, thereby permitting him to spell other words.

Preferably, the blocks 14 are rotatably mounted on the shaft 12, and to that end bearing holes 28 are provided in each block 14. That feature permits the various blocks to be rotated relative to each other, giving the child practice in lining up the mirror-image letters or lining up the animals, etc. However, it is possible to provide that the blocks 14 are not rotatable on the shaft 12, in which case the shaft 12 itself must be rotatable relative to the base 10. In this case, the various blocks rotate together as a group, but the child can be given practice in correctly "stringing" the blocks on the shaft 12 so that all the faces in one group (for instance, the animal faces) are lined up.

Figure 3:
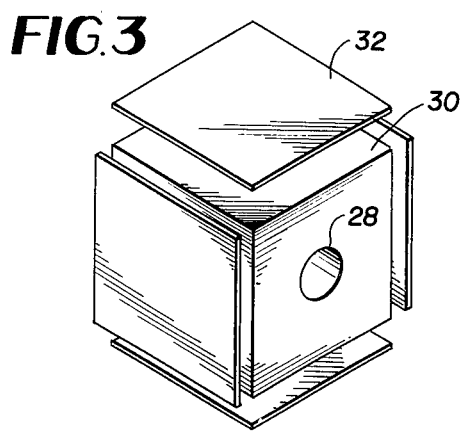
FIG. 3 is a perspective view of an alternative embodiment of the blocks for the embodiment shown in FIG. 1.
Figure 4:
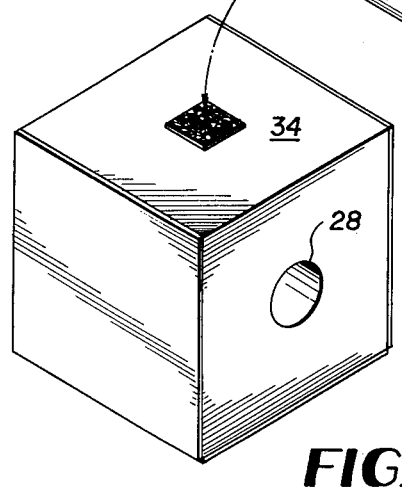
FIG. 4 is a perspective view of still another alternative embodiment of the blocks for the embodiment shown in FIG. 1.

In the FIG. 1 embodiment, the mirror-image indicia are painted on the blocks 14, and this manner of construction is specifically intended to be embraced by the term "carried" in the claim. However, the present invention also contemplates releasably mounting both the mirror-image and the totally backwards indicia on the blocks, and two of many possible means for doing so are illustrated in FIGS. 3 and 4. The FIGS. 3 embodiment is one where the block 30 and indicia bearing panels 32 are held together by magnetic attraction, and the FIG. 4 embodiment is one where the block 34 and the indicia bearing panels 36 are held together by hook-and-eye panels of the type sold under the brand name "Velcro". While FIGS. 3 and 4 show embodiments in which releasable indicia bearing panels can be mounted on each of the four working faces of each block, it is also within the contemplation of this invention to mix permanently painted on and releasably mounted indicia on a single block. Also, it is of course possible to releasably mount just the indicia on each block, rather than mounting panels bearing the indicia. Moreover, it is within the contemplation of this invention to make the face of the indicia (particularly letters, numbers, and arithmetic symbols) of a raised and/or rough surface material to enable students to touch the letters and numbers and to learn by touch as well as sight.

The educational device described above can be used to treat children with either partial or total dyslexia. In the child with partial dyslexia, the blocks will have the letters spelling a word as the child sees it. Turning of blocks to reflect in the mirror enables the child to read the word correctly. For the child with total dyslexia, the top or the front of the blocks will spell the word as the child sees it — totally backwards —, while simultaneously the back sides of the block will show the correct spelling in the mirror.

ADVANTAGES OF THE INVENTION

From the foregoing description of an educational device for dyslexic children in accordance with a preferred embodiment of the invention, those skilled in the art will recognize several advantages which singularly distinguish the subject invention from previously known devices. Some of the advantages are set forth below. However, while the following list of advantages is believed to be both accurate and representative, it does not purport to be exhaustive.

A particular advantage of the subject educational device for dyslexic children is that it is simple and sturdy and that it can be used with very young children (or with children or adults who are retarded as well as dyslexic).

Another advantage of the subject invention is that it can be used to treat both partial and total dyslexia.

A further advantage of the subject invention is that it can be used to teach basic manipulative skills as well as to treat dyslexia.

CAVEAT

While the present invention have been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. An educational device for dyslexic children, said device comprising:
    (a) a base;
    (b) a shaft mounted on said base;
    (c) a plurality of blocks mounted on said shaft for rotation relative to said base;
    (d) a mirror mounted on said base facing said shaft;
    (e) mirror-image alphabetic indicia carried by at least some of said blocks on at least one face of each of said at least some of said blocks in position to be directly visible to the user of said device, said indicia having a normal orientation when seen by normal children and a mirror-image orientation when seen by dyslexic children and said mirror-image indicia being the mirror-image of the form in which they are seen by non-dyslexic children, whereby said blocks can be rotated to positions in which said mirror-image indicia appear in normal orientation in said mirror, allowing the use of said device to compare the mirror-image indicia carried by said blocks with their mirror-images (that is, their normal appearance) in said mirror by simply turning the blocks so that the mirror-image indicia reflect in the mirror; and
    (f) totally backwards alphabetic indicia carried by said at least some of said blocks on at least one face of each of said at least some of said blocks, said totally backwards indicia and said mirror-image indicia on each of said at least some of said blocks being related so that, when the totally backwards indicium is directly visible, the corresponding mirror-image indicium is reflected in said mirror in its normal orientation, allowing the user of the device to compare directly the totally backwards indicia carried by said at least some of said blocks with their normal appearance in said mirror, since both are simultaneously visible.

2. An educational device as recited in claim 1 wherein said blocks are rotatably mounted on said shaft.

3. An educational device as recited in claim 1 wherein said mirror-image indicia are releasably mounted on said blocks.

4. An educational device as recited in claim 1 and further comprising:
    (a) two bearing blocks, one mounted at each end of said base, said bearing blocks having open-topped slots therein sized to journal said shaft, and
    (b) a peg mounted in and projecting from each end of said shaft outside said bearing blocks, thereby limiting the axial movement of said shaft.

5. An educational device as recited in claim 4 wherein said bearing blocks are releasably mounted on said base, said pegs are releasably mounted in said shaft, and said blocks are releasably mounted on said shaft.

6. An educational device as recited in claim 1 wherein said indicia are raised surfaces.

7. An educational device as recited in claim 6 wherein said indicia are roughened surfaces.

* * * * *